US006991161B2

(12) United States Patent
Pazniokas et al.

(10) Patent No.: US 6,991,161 B2
(45) Date of Patent: Jan. 31, 2006

(54) ELECTRONIC VOTING APPARATUS, SYSTEM AND METHOD

(75) Inventors: Paul J. Pazniokas, Brookside, NJ (US); John Stephen Pazniokas, Mansfield, MA (US)

(73) Assignee: Paul Pazniokas, Brookside, NJ (US)

( * ) Notice: Subject to any disclaimer, the term of this patent is extended or adjusted under 35 U.S.C. 154(b) by 0 days.

(21) Appl. No.: 11/061,827

(22) Filed: Feb. 22, 2005

(65) Prior Publication Data

US 2005/0284936 A1 Dec. 29, 2005

Related U.S. Application Data

(60) Provisional application No. 60/582,092, filed on Jun. 23, 2004.

(51) Int. Cl.
*G06F 17/60* (2006.01)
*G06F 17/00* (2006.01)

(52) U.S. Cl. ......................... 235/386; 235/375; 705/12

(58) Field of Classification Search ................ 235/375, 235/386; 705/12
See application file for complete search history.

(56) References Cited

U.S. PATENT DOCUMENTS 5,892,470 A 4/1999 Kusnick
6,779,727 B2 * 8/2004 Warther ................. 235/462.01
2002/0077886 A1 6/2002 Chung
2002/0084325 A1 * 7/2002 Reardon ..................... 235/386
2002/0128901 A1 9/2002 Gibbs, Sr.
2002/0128902 A1 9/2002 Gibbs, Sr.
2003/0034393 A1 2/2003 Chung
2003/0158775 A1 8/2003 Chaum
2004/0024635 A1 * 2/2004 McClure et al. .............. 705/12
2004/0048021 A1 3/2004 Chung

* cited by examiner

*Primary Examiner*—Daniel Stcyr
*Assistant Examiner*—April Taylor
(74) *Attorney, Agent, or Firm*—Antonelli, Terry, Stout and Kraus, LLP.

(57) ABSTRACT

The invention is a method, system, programmed processor and a program stored on a storage medium used for providing voter confirmation that electronically cast ballots have been properly registered. A method for providing voter confirmation that electronically cast ballots have been properly registered in accordance with the invention includes generating a group of unique vote words which each comprise at least one word within at least one language understood by voters at at least one polling location; assigning individual voters at the at least one polling location at least one of the vote words chosen from the group of vote words which is unique to each of the voters, each of the assigned at least one vote word upon casting of voter's ballot being associated and recorded with the voter's ballot electronically cast by the voter at the at least one polling location; and publishing the vote words associated with the ballots which were cast at the at least one polling location whereby a voter who cast a ballot at the at least one polling location may check the published at least one vote word associated with the voter's votes at the at least one polling location as published to permit the voter to verify that the voter's votes were properly recorded.

46 Claims, 5 Drawing Sheets

ELECTRONIC VOTING APPARATUS, SYSTEM AND METHOD

CROSS REFERENCE TO RELATED APPLICATION

This application claims the benefit of the filing date of Provisional patent Application Ser. No. 60/582,092, entitled "A Method for Publicly Publishing Votes While Maintaining Voter Anonymity", filed on Jun. 23, 2004, which application is incorporated herein by reference in its entirety.

BACKGROUND OF THE INVENTION

1. Field of Invention

The present invention relates to voting apparatus, systems and methods of voting.

2. Description of the Prior Art

In recent years, electronic voting machines have brought numerous improvements to the voting process. Because of this technology, votes are tabulated more accurately and in a more timely manner than could ever be accomplished with the older paper-based systems. Along with the improvements, however, have come new concerns centered, largely, around the issue of system security and stability. These concerns have resulted in doubts about the electronic devices and, among many voters, doubts about the integrity of our electoral process.

It would seem desirable, then, to find a way to assure voters that their votes are actually being recorded and counted accurately.

Proposed solutions generally take two forms: 1) adding a "voter-verified paper trail" (VVPT) to the electronic voting booth, and 2) tagging each vote in a way that enables a voter to confirm at a later time that the vote was recorded correctly.

Solutions like Gibbs (U.S. 2002/0128901 A1) provide a PIN (Personal Identification Number) which is generated at the voting location, along with a "voter validation receipt number". Using this PIN and receipt number, the voter can access a national database of votes to determine if his/her vote was recorded correctly.

Chung (U.S. 2004/0046021 A1) proposes the use of a voter ID, unique to each person. When used in conjunction with a "smart card" and printer, a unique "session ID" can then be generated after the vote is cast. This session ID is stored along with the actual vote and can be accessed by the voter after the votes are tallied.

Chaum (U.S. 2003/0158775 A1) proposes a system whereby a ballot is scanned or read and then a portion of that ballot is "released" to the voter, while the rest is destroyed. The portion that is retained by the voter can be linked to the full ballot in order that the voter can prove his/her vote to authorities. Various mechanical methods are proposed for capturing voter "indicia"—that is, elements that are unique to a voter. The output for the voter is a "serial number" which can then be used to access one's vote on the internet.

These solutions attempt to address the issue of an inability to audit electronic voting systems. Yet they introduce new problems, while falling short of solving the auditability problem.

The problems introduced by using a voter-verified paper trail (VVPT) have been described in detail by organizations like the nonpartisan organization "The League of Women Voters of the United States". On May 5, 2004, Kay J. Maxwell—the president of The League of Women Voters (LWV)—responded to an invitation by The Election Assistance Commission to address the controversies surrounding electronic voting systems. Their conclusion was that although "Direct Recording Electronic (DRE) voting systems can be an important part of election reform efforts . . . the League has not been persuaded of the wisdom of VVPT systems." (http://www.lwv.org/where/promoting/votingrights_EACTestimony0504.ht ml).

In her testimony, Ms. Maxwell points out a number of problems with using paper in the polling booth. In automated systems, "printers are the least reliable of computer system components. They jam, they need paper, they are slow and they are an added cost . . . Voters' privacy is also at risk each time a printer jams and a poll worker has to work to remove a paper jam."

The second aspect of the aforementioned proposals is the "tagging" of each vote with a unique identifier that is captured and stored along with the actual vote. Whether the "tag" is called an ID, a "session identifier" or a serial number, the intent is the same: to enable a voter to access his/her vote at a later time to confirm that the vote was recorded correctly.

Unfortunately, the approach in generating this unique identifier also creates a need for an external piece of hardware so that the voter can remember the actual identifier itself. This hardware might be a printer, a "smart card" or some other add-on technology which, as with VVPT, results in unacceptable expense.

Finally, the problem with both approaches is that they significantly impact the actual voting process—changing the very way we go about voting. These changes introduce a complexity into the voting process that may well result in a greater burden on the polling place workers. This complexity may also result in a level of intimidation for voters that results in fewer, rather than more, people casting their votes using these devices.

FIG. 1 illustrates a diagram of a typical polling location 10 at which voters 11 cast electronic ballots with electronic voting machines 16 located in a voting booth 17 which may be utilized with the practice of the present invention. Individual voters 11, after traveling to the polling location 10, wait in a cue and then perform a sign in process, such as approaching a table 12 where one or more poll workers/officials 14 perform the step of authorization such that the voters satisfy local requirements to vote. The voter 11 may satisfy these local requirements by signing his/her name in a registration book next to a copy of his/her previously-recorded signature or by some other mechanisms. For example, in other localities, the voter 11 may show a driver's license or other photo ID. The voter is permitted to vote once the voter 11 satisfies the polling workers/officials 14 that he/she is a properly registered voter. At that point in time, the voter 11 enters into a cue at which the voter is ultimately granted admission to a voting booth 17 containing an electronic voting machine 16 which contains a voting machine controller 18 which may be any form of programmed processor, server, computer, etc. and associated memory storage 20. As is understood, since the voter 11 enters into the confines of the voting booth 17, the voter is completely anonymous—no additional requirement being required for the voter to again identify he/she to a voting official/poll worker 14. Anonymity goes to the very heart of the voting process and any attempt to tie a voter to a specific vote (as with a "smart card" or "other specialized voting identification) runs the risk of eroding the feeling anonymity by the voter. Therefore, as the voter 11 enters the voting booth 17, the voter is unencumbered by anything—except the task of voting using the electronic voting machine 16.

With electronic voting machines 16, the process of casting electronic ballots has become quite simple and efficient. It is important that any attempt to make the voting process more auditable, secure or accurate, not negatively impact ease of using the voting booth 17. Otherwise, such attempts will be considered counterproductive by voting officials and the voters themselves. The votes themselves are stored in the storage 20, which as illustrated, most often is directly attached to the voting machine controller 18 and is typically inside of the voting booth 17 in a secure housing. Once the voter has voted, he/she exits the polling location 10 as indicated.

At the end of the voting day, the votes stored in the storage 20 of each electronic voting machine 16 must be read and consolidated as represented by the consolidate function 22 which may be performed under control of a programmed processor. As illustrated in FIG. 1, a local area network may receive the inputs from all of the individual storages 20 associated with all of the electronic voting machine 16. However, because of consideration of costs, complexity and security, each electronic voting machine 16 is typically a stand alone machine with the consolidate function 22 not being performed electronically. A readout function 24 is coupled to the consolidation function 22, whether done locally with each electronic voting machine 16 or via the consolidation function 22 which provides the polling workers/officials 14 the ability to record the tally of cast votes once the polls are closed. Finally, after the readout 24 has been obtained, the results of the votes cast at the polling location 10 are provided in a report as indicated in the report results function 26. The report results function 26 is essentially the completion of the voting process.

FIG. 2 illustrates a simplified flow chart of the above-described process. The initial step involved with voting is that the voter 11 enters the voting booth 17 containing the electronic voting machine 16 as indicated by step 30. The voting process proceeds from the voter 11 entering the voting booth 17 to the voter 11 being presented with a ballot and making choices while within the voting booth as indicated by step 31. Next, the voter 11 makes his/her selections as indicated by block 32. Thereafter, the voter 11 reviews the selections which he/she has initially made in registering the vote including any changes so as to generate a voter ballot. After the review process, the voter actively indicates to the electronic voting machine 16 that the voting process is done by pushing a button or pulling a lever, etc. as indicated by step 34. A display associated with the electronic voting machine 16, within the voting booth 17 typically will display a message to the voter 11 thanking the voter for voting, as indicated by step 36. Thereafter, the voter 11 exits the voting booth 17 as indicated by step 38.

SUMMARY OF THE INVENTION

The present invention is a method and system for providing voter confirmation that electronically cast votes have been properly registered and tallied and a processor and program stored on a storage medium which generates a group of vote words which are assigned individually to the voters at each polling location and recorded with the voters' selections so that subsequent publication of the vote word and vote makes possible later verification anonymously by the voter that his/her vote was properly cast.

The present invention provides a voter with the ability to confirm that electronically cast votes have been properly registered and tallied which does not require special hardware or a new way of voting. The invention permits each vote to be published in a public forum and each voter to look at his/her vote word as published in association with the voter's vote to confirm that the vote was recorded correctly. Confirmation by the voter that a vote was recorded correctly is accomplished while maintaining total voter anonymity. Moreover, because the invention may be implemented by software running as an application on existing computer systems located at polling locations or elsewhere, including virtual sites, a low-cost and simple approach is obtained which provides an ability to adopt the invention with existing electronic voting machines/systems without the addition of external hardware.

The overall voting process is substantially identical to the prior art as described above with respect to FIG. 1 and only requires that in association with voting the voter is assigned at least one unique vote word in at least one language understood by voters at one polling location which, upon electronic casting of the ballot, is associated and recorded with the voters' votes electronically cast at each polling location. The at least one vote word is unique to the voter, but may be assigned to multiple voters at different polling locations and permits the voter, after completing voting, to access a publishing system at which the votes cast at individual polling locations are published in association with the at least one unique vote word assigned to each voter. The vote words are preferably published in alphabetical order in association with each polling location so that the voter may simply access the publishing system, such as by going on-line to look for the alphabetical word which was associated with the voter's votes at the polling location of the voter. For example, if the voter was assigned the vote word "cat", all that is required is that the voter access the publishing system and input the polling location of the voting district, state, etc and locate the voter's vote word "cat". Associated with the published vote word "cat" will be the voter's vote as cast, thereby permitting the voter to determine that the electronically cast vote has been properly registered and tallied.

It is important to note that with the process of the present invention, the voter has retained an anonymous status throughout the entire process. There is nothing that can associate a person with the at least one vote word assigned to the voter. Since the at least one vote word which is issued to each voter upon voting is issued in an adequately random way and are preferably alphabetized upon publishing, there is no way that people who read the resulting list of votes will be able to identify who cast which votes. This process represents only a small change in the existing voting process since the voter is only required to remember (or write down) at least one simple word, such as, but not limited to the voter's native language. Moreover, this is required to be done only if the voter wishes to audit the vote at a later date. If the voter chooses not to audit his/her vote, the voting process doesn't change at all from the prior art of FIG. 2.

Without limitation, a vote word, such as "cat", "table" or "adventure" is something that a voter easily memorizes or writes down. So the present invention requires no additional hardware, like a printer or a smart card to display or record the vote word for the voter. Instead, the existing electronic voting system software can display the word on the output display device, such as a LCD or LED display.

A method for providing voter confirmation that electronically cast ballots have been properly registered in accordance with the invention includes (a) generating a group of unique vote words which each comprise at least one word within at least one language understood by voters at at least one polling location; (b) assigning individual voters at the at least one polling location at least one of the unique vote words chosen from the group of vote words which is unique to each of the voters, each of the assigned at least one unique vote word upon casting of voter's ballot being associated and recorded with the voter's votes electronically cast by the voter at the at least one polling location; and (c) publishing the unique vote words associated with the votes which were cast at the at least one polling location whereby a voter who cast a ballot at the at least one polling location may check the published at least one unique vote word associated with the voter's votes at the at least one polling location as published to permit the voter to verify that the voter's votes were properly recorded. A plurality of polling locations may be provided; and wherein steps (a)–(c) are performed at each polling location. The group of unique vote words may be used at each polling location. Each polling location may comprise a number n of electronic voting machines; and each polling location may be assigned the group of unique vote words m wherein each unique vote word may be assigned to only a single electronic voting machine with a number of unique vote words k assigned to each electronic voting machine equaling m/n. The at least one language may be a native language of the voter. The at least one unique vote word may comprise two different unique vote words combined from the group of unique vote words which are understood by the voters at each polling location with a number of combined two different unique vote words from the group of unique vote words equaling $m^2$; and each polling location may be assigned the $m^2$ combined two different vote words; each polling location may comprise a number n of electronic voting machines; and each of the combined two different unique vote words may be assigned to only a single electronic voting machine at each polling location with a number of unique vote words assigned to each electronic voting machine equaling $$\frac{m^2}{n}.$$

The invention is also a processor for use with the methods of the present invention.

The invention is also a program stored on a storage medium which, when executed on a processor, performs the generation of the group of unique vote words in accordance with the method of the present invention as described above.

The invention is also a system for providing voter confirmation that electronically cast votes have been properly registered and tallied including at least one electronic voting machine located at at least one polling location; at least one processor for generating a group of unique vote words which each comprise at least one word within at least one least one language understood by voters at at least one polling location which group of unique words are assigned to the at least one voting machine at the at least one polling location such that each voter at the at least one polling location is assigned at least one unique voting word; at least one storage associated with each polling location, each unique vote word upon casting of voter's ballot being associated and recorded with the voter's votes electronically cast by the voter at the at least one polling location by the at least one storage; and a publishing system, which is accessible by the voters at the at least one polling location after casting of ballots by the voters at the at least one polling location that publishes the unique vote words stored by the at least one storage which are associated with the votes which were cast at the at least one polling location whereby a voter who cast a ballot at the at least one polling location may check the published at least one unique vote word associated with the voter's votes at the at least one polling location as published to permit the voter to verify that the voter's votes were properly recorded.

BRIEF DESCRIPTION OF THE DRAWINGS

Like reference numerals identify like parts throughout the drawings.

DESCRIPTION OF THE PREFERRED EMBODIMENTS

Figure 2:
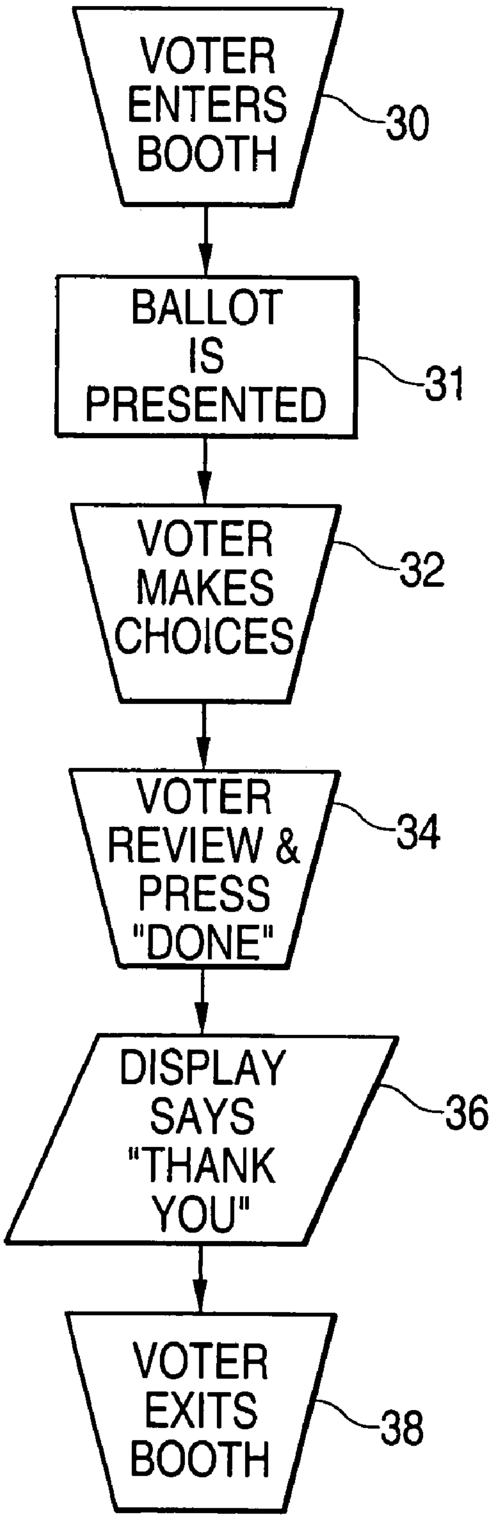
FIG. 2 (PRIOR ART)
FIG. 2 illustrates a flowchart of the existing voting process, such as implemented in the polling location of FIG. 1 and which requires only slight modification for adaptation to practice of the present invention.
Figure 3:
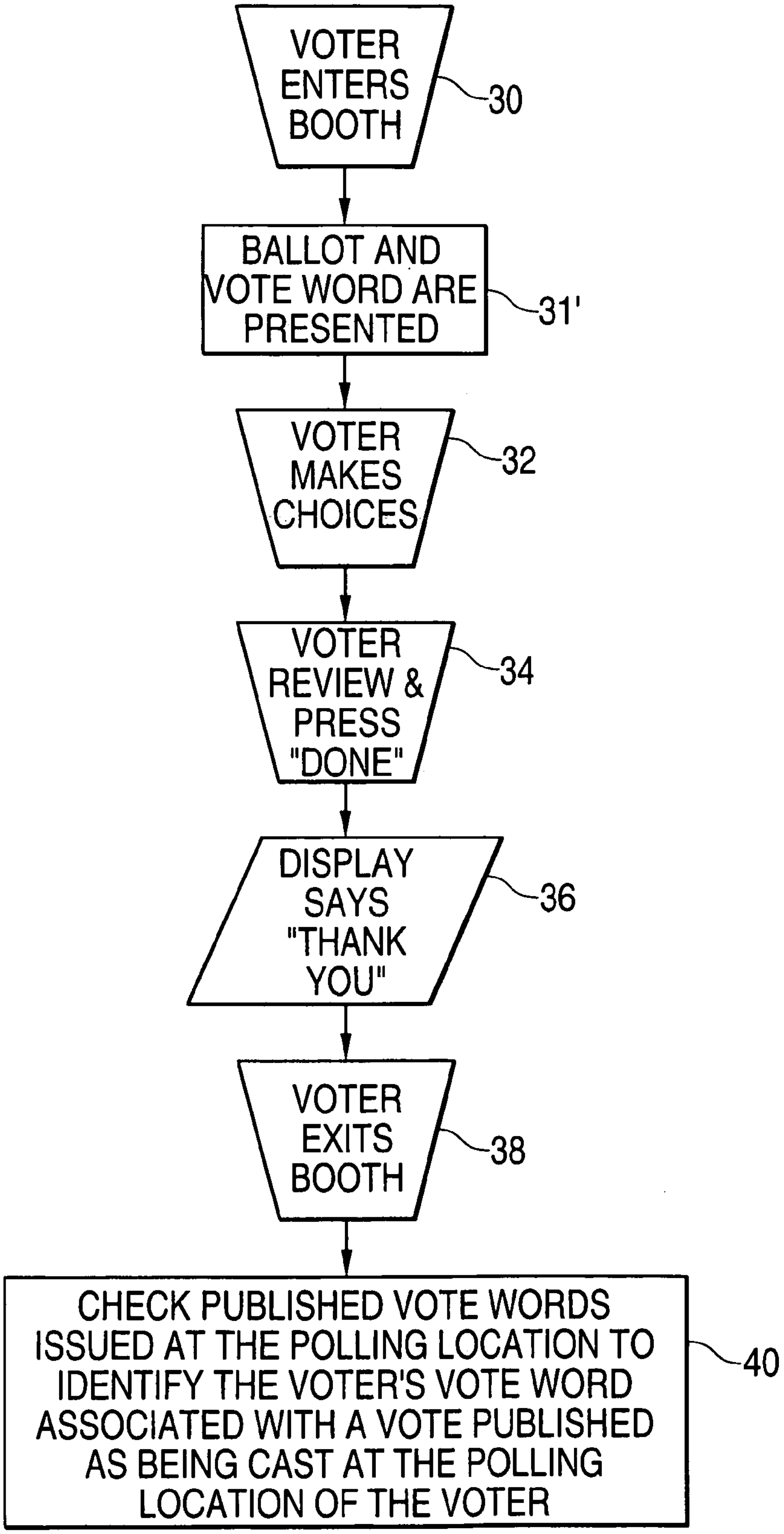
FIG. 3 illustrates a flowchart of the process of the present invention which is a modification of the flowchart of FIG. 2.

FIG. 3 illustrates a flowchart, which is a modification of the flowchart of FIG. 2, setting forth an embodiment of a method of providing voter confirmation of the voter's ballot as cast electronically in accordance with the invention has been properly registered and tallied. Only two additional actions are required to be added to the prior art process of FIG. 2 which are that the presentation of the ballot 31 of the prior art is modified to include the addition thereto of the at least one unique vote word being presented as indicated in block 31' and further, at step 40, the voter 11 checks the published voting word at the polling location or elsewhere thereafter to identify that the voter's at least one unique vote word is associated with the voter's anonymous published votes as cast at the polling location 10' of the voter. Preferably the at least one unique vote word is published in an alphabetical listing so as to facilitate the voter 11 checking quickly for the at least one unique vote word which the voter has either memorized or written down at the time of casting the ballot as indicated at step 31' so as to quickly locate the voter's votes.

Figure 1:
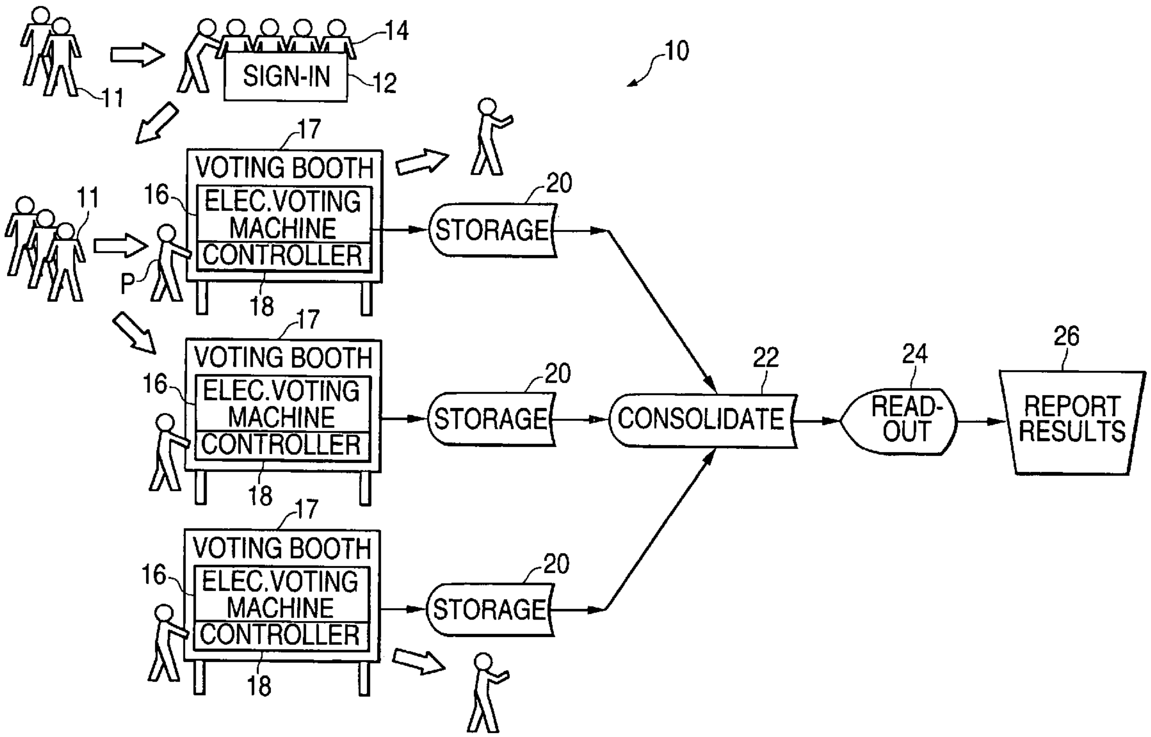
FIG. 1 (PRIOR ART)
FIG. 1 illustrates a diagram of a prior art polling location which may be utilized after modification with the practice of the invention.
Figure 4:
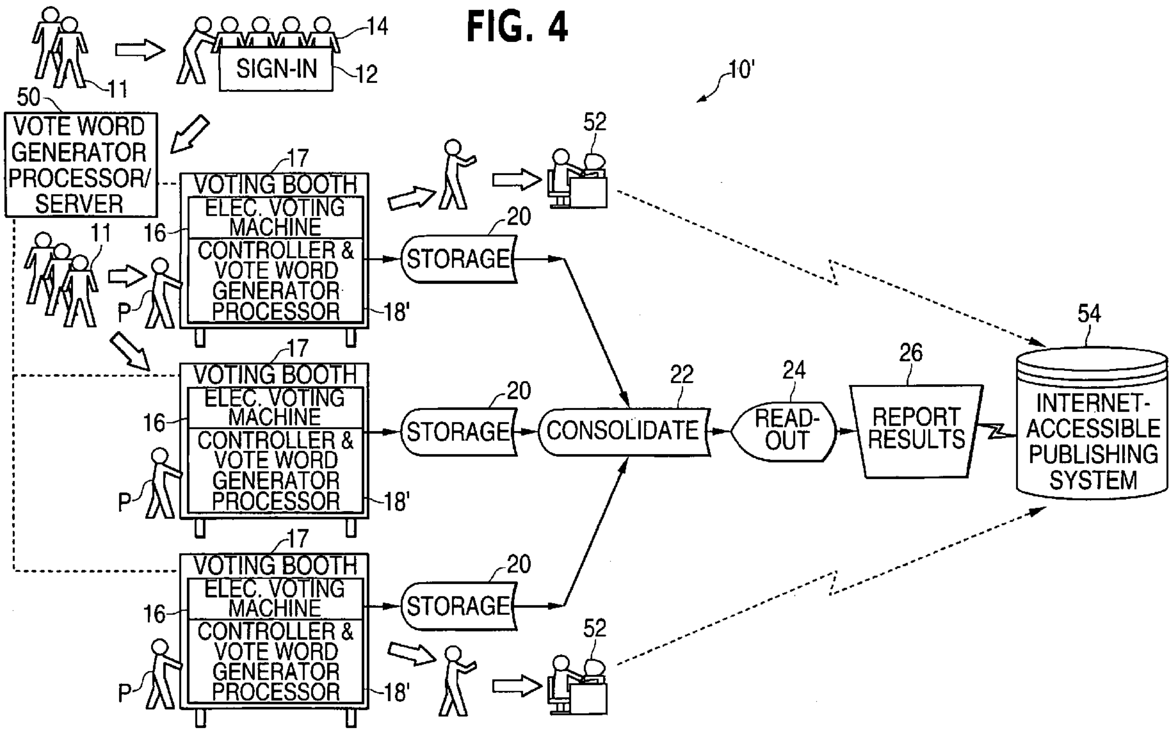
FIG. 4 is a diagram of a polling location which has been modified from FIG. 1 to be in accordance with the present invention.

FIG. 4 illustrates the diagram of a polling location 10' which has been modified from the prior art polling location 10 of FIG. 1 to include the method and system for providing voter confirmation that electronically cast ballots have been properly registered and further, a server for providing a group of unique vote words which each comprise at least one word in at least one language understood by voters at at least one polling location. The group of unique vote words are assigned to the at least one voting machine 16 at the at least one polling location 10' such that each voter 11 at the polling location is assigned at least one unique voting word at the time of voting. The operation of the at least one processor which generates the group of at least one unique vote word may be contained in the controller 18' of each electronic voting machine 16, or alternatively as a central vote word generator processor/server 50 at the polling location 10' or as a part of system 100 of FIG. 5. The at least one electronic voting machine 16 has been modified such that its controller 18' includes a vote word generator processor. The process of generating at least one unique vote word to be assigned to each voter 11 at the polling location 10' is described below. As an alternative to each voting booth controller 18' being modified to include a vote word generator processor, a vote word generator processor/server 50 may be provided for all of the electronic voting machines 16 which assigns the group of unique voting words to each electronic voting machine such that each voter 11 at each voting booth 17 is assigned a unique at least one voting word. Additionally, the polling location 10' may have a workstation, terminal or other device 52 which the voter, after exiting the voting booth 17 visits to communicate with an Internet accessible publishing system 54 to permit the voter to check the vote which is associated with the voter's assigned at least one unique vote word in order to confirm that the electronically cast vote has been properly registered to the voter. As an alternative, the publishing system 54 could be associated locally with the polling location 10', or accessible through other communication means, such as, but not limited to, a wireless or wireline (landline) telephony connection. The invention is not limited to the publishing system 54 which publishes the unique vote words stored by the at least one storage 20 associated with the ballots cast at a polling location 10' and may be at any remote location which is accessible by telecommunications.

Figure 5:
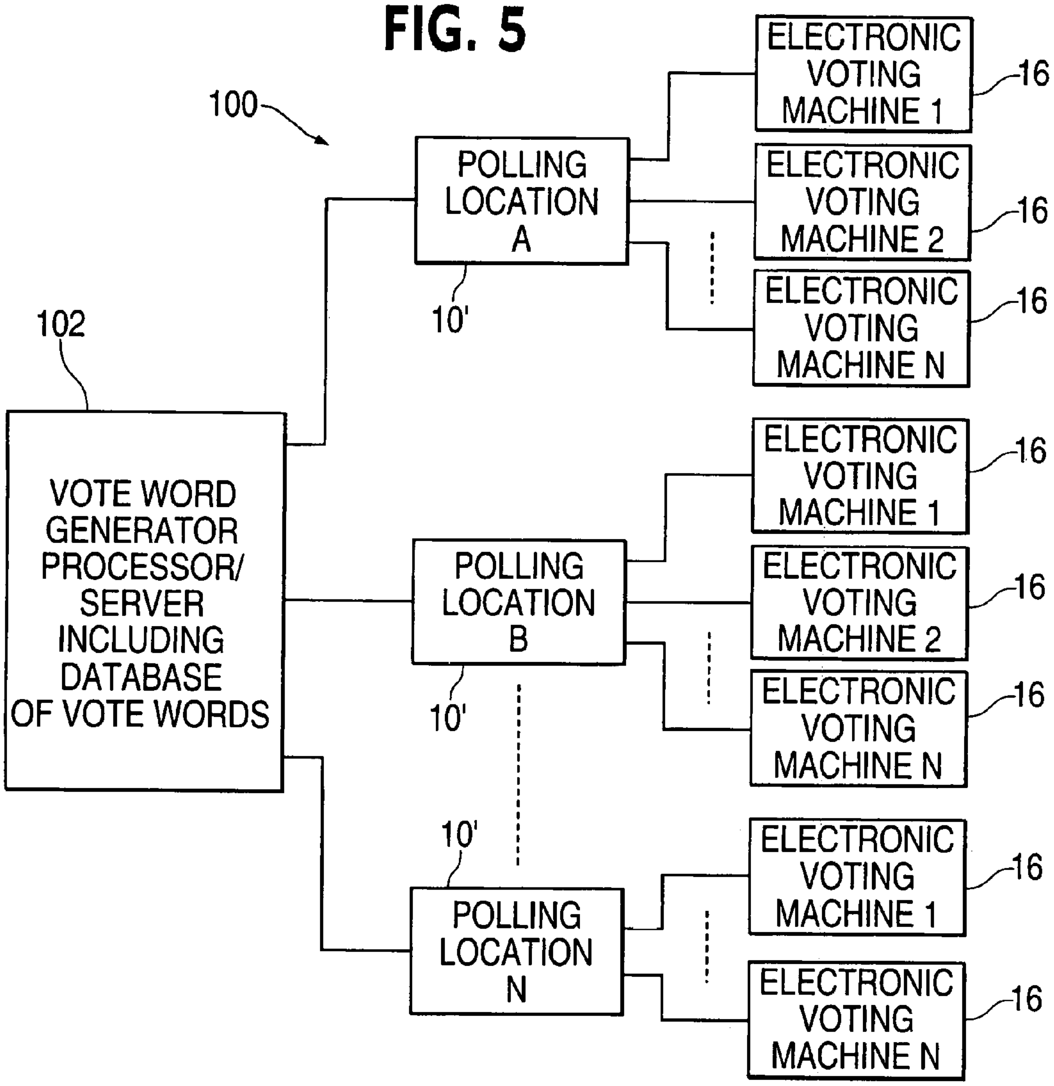
FIG. 5 is a diagram of a system in accordance with the present invention which utilizes a vote word generator processor/server for generating and providing unique vote words to multiple polling locations which each contain one or more voting booths containing electronic voting machines which may be in accordance with the block diagram of FIG. 4.

FIG. 5 illustrates a vote word generator system 100 which may be used for generating the at least one unique vote word which is assigned to a voter 11 to uniquely identify the votes cast by the voter at each polling location 10'. The system 100 comprises a vote word generator server 102 which performs the function of generating at least one unique vote word that is assigned to each voter 11 at at least one electronic voting machine 16 located at each of the polling locations 10'. The vote word generator server 102 may operate on a system wide level to supply vote words which are unique to each voter, at each electronic voting machine 16 at each of the polling locations 10'. As will be described in more detail below, the unique vote words which are generated for a polling location 10' may be repeatedly used for all of the polling locations since the publication of the unique vote word, as associated with a vote cast by a voter at an electronic voting machine 16, at any polling location 10', is accessible by locating the at least one vote word as published in association with the polling location.

The following is an example of one, but not the only way, that votes may be published so that a voter can easily access his/her vote, anonymously, to confirm that it was recorded and tallied correctly.

Election for President of the United States

State of New Jersey (Towns listed alphabetically)

| Voteword | Recorded vote |
|---|---|
| Anytown | |
| Fire Station | |
| apple | John Smith |
| cat | John Smith |
| dog | John Smith |
| drizzle | Sally Jones |
| zebra | Sally Jones |
| Elementary School | |
| ant | Sally Jones |
| apple | Sally Jones |
| drop | John Smith |
| zebra | John Smith |
| Sampletown | |
| City Hall | |
| add | Sally Jones |
| gopher | John Smith |
| haze | John Smith |
| little | Sally Jones |
| zebra | Sally Jones |
| Sampletown Middle School | |
| butter | John Smith |
| crumb | Sally Jones |
| drop | John Smith |
| zebra | John Smith |

It should be noted that certain vote words appear in more than one voting location ("zebra", for example). Even though this happens, the vote word is unique for each voter 11, in a polling voting location 10', so each voter can find his/her specific vote by accessing the published system 54.

The following is an example of the software specifications that may be used for a program that issues the at least one unique vote word.

Upon request, the program pseudo-randomly chooses a word from a table of "n" number of words, marks that word as "used" and then delivers that word to the invoking process. The program then waits for another such request. This is, in essence, the entire program cycle. Of course, there are exceptions and contingencies that a software program must address. These are discussed below in the "Detailed Description of Main Processing" section. Basic assumptions about this program are as follows.

The program executes (runs) in the CPU of a computer, controller or server that may be located in an individual electronic voting machine 16 as discussed above. Where there are multiple voting booths 17 in a polling location 10' (e.g., a school gym, a fire station, a municipal government building) it cannot be assumed that there will be inter-booth communications. For this reason, the software is preferably designed to handle the creation of unique vote words in both standalone and networked booth configurations with at least one unique vote word being assigned to each voter at a polling location 10'.

It is assumed that, typically, the invoking process would be in the purview of the vendor which designed the electronic voting machine 16 and its related hardware/software systems. So the present program would, generally, not be responsible for delivering the unique vote word directly to the voter 11. After all, the program has no knowledge of what kind of output method a particular electronic voting machine will employ: LED display, printer, audible, Braille—or any other. Therefore, this program is designed as a routine that can be easily invoked by another software program.

The table of words that the program delivers is stored either in random access memory 20 (RAM) or another direct-access type of media (e.g., a microdrive). Note also that, typically, there are as many tables of words as there are languages that are supported in at a specific polling location 10'.

Detailed Description of Main Processing

This program is invoked with three optional arguments/parameters: (1) the language, (2) the maximum number of voting machines 16 (booths 17) at a polling location 10' and (3) the booth ID of the electronic voting machine 16. All three parameters are integers.

These parameters are referred to as "lang_ID", "max_booth" and "booth_ID". The lang_ID parameter could be different on each invocation of this program, depending on the language preference of a particular voter. The second two parameters, however, would never change during the course of an election session after those parameters are initially set. That is, once it has been established that there are, say, seven electronic voting machine booths then this cannot be changed to another value in the middle of an election.

The first argument, in essence, tells the program the native language of the voter. Programmatically, the argument is an integer that points the program to the word table that is to be used. If no parameter is supplied, then the program uses the default table. In the United States, this would typically be a table of English words. In other countries the default table would consist of words in that nation's language.

The presence of the second and third arguments, which are always used together, tells the program that it is operating in a multiple-booth electronic voting machine environment, complicated by the fact that there is no inter-booth communication. When the voting authorities implement this type of configuration, the program must be able ensure uniqueness of delivered words throughout a room or hall where each booth 17/electronic voting machine 16 is not in communication with either the other booths/electronic voting machines or with a central, shared table or database of words.

If these two arguments are not present, then max_booth and booth_ID are assumed to be "1". This would occur where there is, in fact, only one booth in a polling location. But, it would also occur in the situation where multiple booths 17/electronic voting machines 16 are inter-connected by a wired or wireless network. In this case, the invoking program does not need to specify how many booths/electronic voting machines there are because—in a networked environment—a shared database, by its very nature, is designed to issue unique ID's to all the network's workstations (in this case, voting booths).

When the program does, in fact, receive the max_booth and booth_num arguments, it is designed to ensure uniqueness of vote words within that voting location. To accomplish this, it divides the table of "n" words into "max_booth" number of parts. The program then considers the segment of the table identified by the integer "booth_num" to be the "home" segment. For example, consider the case of a 14-booth polling location which draws on a database of 8,000 vote words. If a booth is programmed as booth number (booth_num) 6, then the program considers the 6th segment of the 8,000-entry Voteword table to be its "home" segment.

The program then issues unique vote words only from its home segment—in this case, the 571 words that lie in the 6th (of 14) equal-size section of the 8,000-word table. If it runs out of unique vote words, the program then begins issuing word-pairs. To do this without issuing a vote word pair that another non-networked voting booth gives out, it issues unique vote word pairs that have, as the first word in the pair, a word which resides in that booth's home segment. Further, it never issues a vote word pair where the first word in the pair does not come from its home segment. In this way, no two non-communicating booths will ever issue the same unique vote word pair.

As with single-word unique vote words, the program keeps track of already-issued vote words so that it does not issue them again.

Using the word-pair approach, the maximum number of unique vote words that can be issued from one table that contains "n" number of words is $n^2$.

It is not desirable to have word-pairs where both elements are the same (e.g., "apple—apple" or "giraffe—giraffe"). Factoring those out means that the maximum number of valid word-pairs that can be issued from one table is $$n^2-n$$

Adding back in the single-word unique vote words that a booth issues means that the total number of unique vote words that can be issued is—

$$n^2-n+n$$

or, simply, once again—

$$n^2$$

Thus, in our example, an 8,000-word table is capable of generating 64,000,000 vote words. And, in an individual voting booth 17' which does not communicate with a central vote word generator processor/server 50, the maximum number of possible unique vote words is $n^2$/max_booth.

The word-pair methodology could be expanded so that this program issues "word-trios", "word-quartets" and so forth. Thus, for three and four word pairings, the total number of unique vote words respectively would be $n^3$/max_booth and $n^4$/max_booth, though local officials may have preferences as to how many of the words—and within what positions—would be allowed to repeat within such multiple-word vote words. For example, would "giraffe-apple-giraffe" be permissible versus "giraffe-giraffe-apple"? Such rules would reduce the number of vote word trios and vote word quartets. Issuing such unique vote words, though, would place a strain on a voter's ability to memorize his/her vote word and would thus be counterproductive.

Note that the software which comprises the present invention is designed to operate as a "sub-process" of existing electronic voting machine 16 software applications. As such, it performs a very specific task: issuing unique vote words. It does not perform any of the tasks commonly associated with voting machine applications: operating the display, preventing over-votes, recording and storing the votes, etc. In this configuration, the existing voting machine software is referred to as the "invoking software".

The source code included herein is written in the Java programming language because of that language's "portability"—it can run in many operating system environments. But it could, as well, be written in other languages, depending on the invoking software's requirements.

The database of words.

Another part of the present invention is the use of a word to identify a vote. Two main considerations must be taken into account when issuing a vote word: type of words used and the number of words needed.

In considering the type of words used, note that there is only one vote word list. This approach simplifies the implementation and maintenance of the voting environment. Every polling location 10' in the country has the same vote word list: a fire station in Illinois, an elementary school in Utah, etc.

In addition, the present invention uses native-language words. Therefore, there will be a database of words in as many languages as the invoking software supports.

In choosing the type of vote words to use, the following has been taken into account:

Brevity. The shorter the word, the easier to remember or scribble down.

Familiarity. Even though a word may be short, it might not be familiar to most people and, therefore, it might not be easily memorized. Thus, words like "darb" or "pensum" are not deemed suitable.

Homonyms. Including words that are homonyms of one another increases the chances that a voter may mistake one vote word for another. So the vote word database should contain either "fair" or "fare", but not both.

Easily misread words. Using words that can be misread for another—or remembered as another—is not desirable. The database, then, should not contain words like "afoot" or "askew".

Offensive words. Words that are considered obscene or offensive should not be in the database. Nor should an offensive phrase result from the creation of a word pair. To prevent the creation of such phrases, certain words are eliminated from the database—for example, "it", yours", you and "me".

Emotionally-charged words. Words like "amputate", "cancer" and "abortion" can offend voters because of the emotional connotations associated with those words. They should not be used.

Combination words. Because the software may have to combine vote words, as described below, "double" words should not be used: "comedown", "sandbag", etc. It would be confusing if the software issued a vote word of "sand-sandbag".

Other confusing words. Words that could get confused with common election-day words should be excluded from the list: "candidate", "president", "thank", and so forth.

The other major consideration in designing the vote word database is the issue of the number of unique vote words needed. At first blush it may seem that the database of words would have to be enormous. However, note that, although the vote word for every voter must be unique, it need be unique only within a voting location.

Consider the situation where Voter A is voting at the fire station in Anytown, USA and receives a vote word of "table". Voter B, across town is voting at the elementary school and also receives "table" as a unique vote word. When these two voters look up their respective votes the next day, they will find these votes arranged alphabetically by vote word within each voting location. Voter A, then, will know enough to find "table" in the fire station list, while Voter B will look in the elementary school list. This design greatly reduces the number of words needed.

While voters can easily remember where they voted (the fire station or the elementary school, for example)—they cannot be expected to remember which voting machine they used. For this reason, no two voting machines 16 in a polling location 10' can issue the same unique vote word.

Complicating this requirement is the fact that the electronic voting machines 16 in many, if not most, polling locations 10' are "standalone". That is, they are not connected by a local area network ("LAN")—either wired or wireless. Note that this architecture is often by design: voting authorities desire neither the complexity nor the expense associated with LAN-connected electronic voting machines 16. This standalone configuration of the electronic voting machines 16 means that no voting booth 17 can know what unique vote words another booth has already issued. Thus, the software running on a processor, such as a PC, workstation or server, which issues these unique vote words must be designed to ensure uniqueness of voting words between electronic voting machines 16.

The present invention provides for word uniqueness between non-communicating electronic voting machines 16 by subdividing the word list in each electronic voting machine 16 into as many sections as the maximum number of machines in a voting location.

For example, suppose that there are forty (40) electronic voting machines 16 in a particular polling location 10'. In preparation for election day, the local authorized election personnel set the software's starting option to (at least) "40". In addition, each electronic voting machine 16 receives a unique, sequential number, starting with "1". With this simple set-up, each electronic voting machine's software can "stay out of the others' way" when issuing vote words. This configuration may be performed as part of the typical initial set-up process for an election.

Where inter-machine communication—like a wired or wireless LAN—does exist it means that the central ("server") machine 50 or 102 is free to issue words from a single database—so there is no need to subdivide the list of vote words. Note that this is entirely transparent to the software portion of the present invention. The fact that the software is issuing words to one, thirty, sixty or one hundred machines is all the same in a networked environment, because a single instance of the software is controlling the marking of words as "used".

The following is an example of a group of unique vote words which, without limitation, may be used with the practice of the present invention.

A SAMPLE VOTE WORD LIST

| | | | | |
|---|---|---|---|---|
| abandon | abbey | abdomen | abnormal | abode |
| abolish | about | above | abrupt | absence |
| absolute | absorb | abstain | abstract | absurd |
| abuse | abuzz | abyss | academy | accent |
| accept | access | accident | acclaim | account |
| accurate | accuse | accustom | ace | ache |
| achieve | acid | acme | acorn | acoustic |
| acre | acrobat | across | action | active |
| actor | act | actual | addition | address |
| add | adequate | adhere | adjacent | admire |
| admit | adobe | adopt | adorable | adore |
| adult | advance | advent | adverb | advice |
| aerobic | aerosol | affair | affluent | afford |
| affront | after | again | against | age |
| agency | agenda | agent | aghast | agile |
| agitate | ago | agony | agree | ahoy |
| aid | ailment | aim | air | aisle |
| alarm | alas | albino | album | alcohol |
| alcove | ale | alert | algae | alias |
| alibi | alien | alimony | alkaline | allege |
| allergy | alliance | alloy | all | almighty |
| almond | almost | alone | alphabet | already |
| also | altar | although | altitude | alto |
| aluminum | always | am | amateur | amazing |
| amber | ambition | amble | ambush | amend |
| amiable | amigo | ammo | among | ample |
| amplify | amp | amuse | analyze | anarchy |
| anatomy | ancestor | anchor | anchovy | ancient |

-continued

A SAMPLE VOTE WORD LIST

| | | | | |
|---|---|---|---|---|
| and | android | anecdote | anemia | angel |
| angry | anguish | animal | animate | ankle |
| annex | announce | annoy | annual | annul |
| anoint | another | answer | antacid | antenna |
| ant | anthem | antic | antidote | antique |
| antler | anvil | anxiety | anyway | apathy |
| ape | apology | appeal | appear | appendix |
| append | appetite | applaud | apple | apply |
| appoint | appraise | approach | approve | apricot |
| April | apron | apt | aqua | arbor |
| arcade | archer | arch | arctic | area |
| are | arena | argon | argue | aria |
| arid | ark | armada | arm | armor |
| army | aroma | around | arraign | arrange |
| arrest | arrive | arrogant | arrow | arsenal |
| arsenic | arson | artery | article | artist |
| art | ASAP | asbestos | ascend | ashamed |
| ash | Asia | ask | aspirin | assemble |
| asset | assign | assist | assume | assure |
| asterisk | asteroid | asthma | astonish | astound |
| astute | athlete | Atlantic | atlas | atom |
| atrium | attach | attain | attempt | attend |
| attic | attire | attitude | attorney | attract |
| auction | audience | audio | audit | augment |
| aunt | aurora | austere | author | automate |
| autumn | avenge | avenue | average | aviator |
| avid | avocado | awaken | award | aware |
| awe | awesome | awful | awkward | awning |
| axiom | axis | axle | aye | azure |
| babble | baboon | baby | bacon | badge |
| bad | baffle | bagel | baggage | baggy |
| bag | bah | bail | bait | bake |
| balance | balcony | bald | ballad | ballet |
| ball | balloon | ballot | balm | baloney |
| balsa | Bambi | bamboo | banal | banana |
| bandage | band | bandit | bane | bang |
| banish | banjo | bank | banner | banquet |
| ban | bantam | baptism | barb | barbecue |
| barber | bard | bare | bargain | barge |
| baritone | bark | barley | barnacle | barn |
| baron | barrel | barren | barrier | barter |
| bar | base | basement | bashful | bash |
| basic | basil | basin | basis | basket |
| bask | bassoon | bass | batch | bath |
| baton | bat | battle | bay | bazaar |
| bazooka | beach | bead | beagle | beaker |
| beak | beam | bean | beard | bear |
| beast | beat | became | because | become |
| bedlam | bed | beef | bee | been |
| beep | beer | beetle | beet | before |
| began | beget | beggar | begin | beg |
| beguile | behave | behind | behold | beige |
| being | belch | Belgium | believe | bell |
| belly | belong | beloved | below | belt |
| beluga | bench | bend | beneath | benign |
| bent | beret | Bermuda | berry | berserk |
| beseech | beset | beside | besiege | best |
| bestow | bet | betray | between | betwixt |
| bevy | beware | bewilder | bewitch | beyond |
| bias | bib | biceps | bicker | bicycle |
| biddy | bid | bifocal | bigamy | bigger |
| bigot | big | biker | bile | bilk |
| billion | bill | binary | bind | binge |
| bingo | bin | biology | bionic | birch |
| birdie | bird | birth | biscuit | bishop |
| bison | bistro | bite | bit | bitter |
| blab | black | bladder | blade | blame |
| bland | blanket | blank | blare | blast |
| blatant | blaze | bleach | bleary | bleed |
| blemish | blend | bless | blight | blimp |
| blind | blink | blip | bliss | blister |
| blitz | bloat | blob | block | blond |
| blood | bloom | blooper | blossom | blot |
| blouse | blow | blubber | blue | bluff |
| blunder | blunt | blur | blush | board |
| boar | boast | boat | bob | bode |
| body | bogey | bog | bogus | boil |

-continued

A SAMPLE VOTE WORD LIST

| | | | | |
|---|---|---|---|---|
| bold | bolo | bolt | bomb | bonanza |
| bond | bone | bonfire | bongo | bonkers |
| bonnet | bonus | boo | book | boom |
| boost | boot | booth | booze | bop |
| bore | born | Borneo | borrow | boss |
| Boston | botany | botch | bother | both |
| bottle | bottom | bought | boulder | bounce |
| boundary | bound | bounty | bouquet | bout |
| bowl | bow | box | boy | brace |
| bracket | brag | braid | brain | brake |
| bramble | branch | brand | brash | brass |
| brat | brave | brawl | brawn | Brazil |
| breach | bread | break | breast | breath |
| breech | breed | breeze | brew | bribe |
| brick | bride | bridge | bridle | brief |
| brigade | bright | brig | brim | brine |
| bring | brink | brisk | bristle | Britain |
| britches | brittle | broach | broad | brochure |
| broil | broken | bronco | bronze | brood |
| brook | broom | brother | broth | brought |
| brow | brown | browse | bruise | brunch |
| brunette | brunt | brush | brutal | bubble |
| buckaroo | bucket | buckle | budge | budget |
| bud | buffalo | buff | buffet | buffoon |
| bug | bugle | build | bulb | bulge |
| bulk | bullet | bull | bully | bump |
| bum | bunch | bundle | bunk | bunny |
| bun | bunt | burden | bureau | burger |
| burglar | burgundy | burlap | burly | Burma |
| burn | burp | burr | burst | bury |
| bus | bush | business | buster | bust |
| busy | but | butcher | butler | butter |
| button | butt | buy | buzz | buzzer |
| bye | byte | cabana | cabbage | cabinet |
| cabin | cable | caboose | cab | cackle |
| cactus | caddy | cadet | caffeine | cage |
| cajole | cake | calcium | calendar | calf |
| caliber | calico | call | calm | calorie |
| calypso | camel | camera | cam | camp |
| campus | Canada | canal | canary | cancel |
| candid | candle | candy | cane | canine |
| canister | canker | can | canoe | canon |
| canopy | canteen | canvas | canyon | capable |
| caper | cape | capital | cap | capstan |
| capsule | captain | captive | capture | caramel |
| caravan | carbon | card | cardiac | cardinal |
| care | caress | cargo | carob | carol |
| carriage | carrot | carry | cart | carton |
| car | carve | cascade | case | cashew |
| cash | cashmere | casino | cask | cassette |
| castanet | castaway | cast | castle | casual |
| catalog | catch | category | cater | cat |
| cattle | caulk | cause | cave | cavity |
| cavort | caw | cease | cedar | ceiling |
| celery | cellar | cell | cello | cement |
| censored | census | center | central | ceramic |
| cereal | certain | certify | chafe | chain |
| chair | chalet | chalk | chamber | champ |
| chance | change | channel | chant | chaos |
| chapel | chap | chapter | charade | charcoal |
| chard | charge | chariot | charity | charm |
| chart | chase | chasm | cheap | cheat |
| check | cheddar | cheek | cheers | cheese |
| cheetah | chef | chemical | cherry | cherub |
| chess | chest | chew | chicken | chic |
| chide | chief | child | chili | chill |
| chime | chimney | chimp | china | chin |
| chip | chirp | chivalry | chive | choice |
| choir | choke | chomp | choose | chop |
| chord | chore | chorus | chose | chowder |
| chow | chrome | chronic | chuck | chuckle |
| chug | chum | chunk | churn | cider |
| cigar | cinch | cinder | cinema | cinnamon |
| circa | circle | circuit | circus | citadel |
| citizen | citric | citrus | city | civic |
| civilian | clack | clad | claim | clam |
| clamp | clank | clap | clarify | clarinet |

-continued

| A SAMPLE VOTE WORD LIST | | | | |
|---|---|---|---|---|
| clash | clasp | class | classic | classify |
| clatter | clause | claw | clay | clean |
| clear | cleave | clef | clench | clergy |
| clerk | clever | click | client | cliff |
| climate | climax | climb | clinch | cling |
| clinic | clink | clip | cloak | clock |
| clod | clog | clomp | close | closet |
| cloth | clot | cloud | clove | clown |
| cloy | club | cluck | clue | clump |
| clumsy | clunk | cluster | clutch | clutter |
| coach | coal | coarse | coast | coat |
| coax | cobalt | cobra | cob | cockatoo |
| cocoa | coconut | cocoon | coda | coddle |
| code | cod | coffee | cog | cohort |
| coif | coil | coin | coke | cola |
| cold | collapse | collar | collate | collect |
| college | collide | collie | colon | color |
| colt | column | coma | comb | comedian |
| comedy | comet | comfort | comic | command |
| commence | comment | commit | common | commute |
| compact | company | compare | compass | compel |
| compete | compile | complain | complete | complex |
| comply | compose | compound | compress | compute |
| comrade | concave | conceal | concept | concern |
| concert | conch | concise | conclude | concoct |
| concrete | concur | condemn | condone | condor |
| conduct | confer | confide | confine | confirm |
| conform | confuse | conga | congeal | congest |
| conifer | conk | connect | connive | conquer |
| consent | consign | consist | console | consul |
| consult | consume | contact | contain | content |
| contort | contour | control | convene | convert |
| convex | convey | convict | convoke | convoy |
| cook | cookie | cool | coop | coot |
| cope | copy | coral | cord | core |
| cork | Cork | corn | corona | correct |
| corrode | corrupt | cortex | cosmic | cost |
| cot | cotton | couch | cougar | cough |
| could | counsel | count | country | coup |
| couple | coupon | courage | course | court |
| cousin | cove | cover | cow | coy |
| coyote | cozy | crab | crack | cradle |
| craft | crag | cram | crane | crank |
| crash | crass | crate | crave | crawl |
| crazy | creak | cream | crease | credit |
| creed | creek | creep | crest | crew |
| crib | crick | crime | crimp | cringe |
| crisis | crisp | critic | critter | croak |
| crocus | crony | crook | croon | crop |
| cross | crouch | crowd | crow | crown |
| crude | cruel | cruise | crumb | crunch |
| crush | crust | cry | crystal | cub |
| cuckoo | cucumber | cuddle | cue | cuff |
| cuisine | cull | culprit | cult | culture |
| cupid | cup | curb | cure | curfew |
| curious | curl | current | curry | curtain |
| curve | cushion | cusp | cuss | custody |
| custom | cute | cut | cyan | cycle |
| cymbal | | | | |

While the invention has been described in terms of its preferred embodiments, it should be understood that numerous modifications may be made thereto without departing from the spirit and scope of the present invention. It is intended that all such modifications fall within the scope of the appended claims

What is claimed is:

1. A method for providing voter confirmation that electronically cast ballots have been properly registered comprising:

(a) generating a group of unique vote words which each comprise at least one word within at least one language understood by voters at at least one polling location;

(b) assigning individual voters at the at least one polling location at least one of the unique vote words chosen from the group of vote words which is unique to each of the voters, each of the assigned at least one unique vote word upon casting of voter's ballot being associated and recorded with the voter's votes electronically cast by the voter at the at least one polling location; and (c) publishing the unique vote words associated with the ballots which were cast at the at least one polling location whereby a voter who cast a ballot at the at least one polling location may check the published at least unique one vote word associated with the voter's votes at the at least one polling location as published to permit the voter to verify that the voter's votes were properly recorded.

2. A method in accordance with claim 1 comprising:

a plurality of polling locations; and wherein steps (a)–(c) are performed at each polling location.

3. A method in accordance with claim 2 wherein:

the group of unique vote words is used at each polling location.

4. A method in accordance with claim 3 wherein:

each polling location comprises a number n of electronic voting machines; and each polling location is assigned the group of unique vote words m wherein each unique vote word is assigned to only a single electronic voting machine with a number of unique vote words k assigned to each electronic voting machine equally m/n.

5. A method in accordance with claim 4 wherein:

the at least one language is a native language of the voter.

6. A method in accordance with claim 5 wherein:

the at least one unique vote word comprises two different vote words combined from the group of unique vote words which are understood by the voters at each polling location with a number of combined two different vote words from the group of unique vote words equaling m2 and each polling location is assigned the $m^2$ combined two different unique vote words;

each polling location comprises a number n of electronic voting machines; and each of the combined two different unique vote words are assigned to only a single electronic voting machine at each polling location with a number of unique vote words assigned to each electronic voting machine equaling $$\frac{m^2}{n}.$$

7. A processor for use with the method of claim 6 at each polling location wherein:

the processor generates the group of unique vote words.

8. A processor for use with the method of claim 5 at each polling location wherein:

the processor generates the group of unique vote words.

9. A processor for use with the method of claim 4 at each polling location wherein:

the processor generates the group of unique vote words.

10. A method in accordance with claim 3 wherein:

the at least one language is a native language of the voter.

11. A method in accordance with claim 10 wherein:

the at least one unique vote word comprises two different vote words combined from the group of unique vote words which are understood by the voters at each polling location with a number of combined two different vote words from the group of unique vote words equaling $m^2$ and each polling location is assigned the $m^2$ combined two different unique vote words;

each polling location comprises a number n of electronic voting machines; and each of the combined two different unique vote words are assigned to only a single electronic voting machine at each polling location with a number of unique vote words assigned to each electronic voting machine equaling $$\frac{m^2}{n}.$$

12. A processor for use with the method of claim 11 at each polling location wherein:

the processor generates the group of unique vote words.

13. A processor use with the method of claim 10 at each polling location wherein:

the processor generates the group of unique vote words.

14. A method in accordance with claim 3 wherein:

the at least one unique vote word comprises two different vote words combined from the group of unique vote words which are understood by the voters at each polling location with a number of combined two different vote words from the group of unique vote words equaling $m^2$ and each polling location is assigned the $m^2$ combined two different unique vote words;

each polling location comprises a number n of electronic voting machines; and each of the combined two different unique vote words are assigned to only a single electronic voting machine at each polling location with a number of unique vote words assigned to each electronic voting machine equaling $$\frac{m^2}{n}.$$

15. A processor for use with the method of claim 14 at each polling location wherein:

the processor generates the group of unique vote words.

16. A processor for use with the method of claim 3 at each polling location wherein:

the processor generates the group of unique vote words.

17. A method in accordance with claim 2 wherein:

each polling location comprises a number n of electronic voting machines; and each polling location is assigned the group of unique vote words m wherein each unique vote word is assigned to only a single electronic voting machine with a number of unique vote words k assigned to each electronic voting machine equally m/n.

18. A method in accordance with claim 17 wherein:

the at least one language is a native language of the voter.

19. A method in accordance with claim 18 wherein:

the at least one unique vote word comprises two different vote words combined from the group of unique vote words which are understood by the voters at each polling location with a number of combined two different vote words from the group of unique vote words equaling $m^2$ and each polling location is assigned the $m^2$ combined two different unique vote words;

each polling location comprises a number n of electronic voting machines; and each of the combined two different unique vote words are assigned to only a single electronic voting machine at each polling location with a number of unique vote words assigned to each electronic voting machine equaling $$\frac{m^2}{n}.$$

20. A processor for use with the method of claim 19 at each polling location wherein:

the processor generates the group of unique vote words.

21. A processor for use with the method of claim 18 at each polling location wherein:

the processor generates the group of unique vote words.

22. A processor for use with the method of claim 17 at each polling location wherein:

the processor generates the group of unique vote words.

23. A method in accordance with claim 10 wherein:

the at least one language is a native language of the voter.

24. A method in accordance with claim 23 wherein:

the at least one unique vote word comprises two different vote words combined from the group of unique vote words which are understood by the voters at each polling location with a number of combined two different vote words from the group of unique vote words equaling $m^2$ and each polling location is assigned the $m^2$ combined two different unique vote words;

each polling location comprises a number n of electronic voting machines; and each of the combined two different unique vote words are assigned to only a single electronic voting machine at each polling location with a number of unique vote words assigned to each electronic voting machine equaling $$\frac{m^2}{n}.$$

25. A processor for use with the method of claim 24 at each polling location wherein:

the processor generates the group of unique vote words.

26. A processor for use with the method of claim 23 at each polling location wherein:

the processor generates the group of unique vote words.

27. A method in accordance with claim 2 wherein:

the at least one unique vote word comprises two different vote words combined from the group of unique vote words which are understood by the voters at each polling location with a number of combined two different vote words from the group of unique vote words equaling $m^2$ and each polling location is assigned the $m^2$ combined two different unique vote words;

each polling location comprises a number n of electronic voting machines; and each of the combined two different unique vote words are assigned to only a single electronic voting machine at each polling location with a number of unique vote words assigned to each electronic voting machine equaling $$\frac{m^2}{n}.$$

28. A processor for use with the method of claim 27 at each polling location wherein:

the processor generates the group of unique vote words.

29. A processor for use with the method of claim 2 at each polling location wherein:

the processor generates the group of unique vote words.

30. A method in accordance with claim 1 wherein:

each polling location comprises a number n of electronic voting machines; and each polling location is assigned the group of unique vote words m wherein each unique vote word is assigned to only a single electronic voting machine with a number of unique vote words k assigned to each electronic voting machine equaling m/n.

31. A method in accordance with claim 30 wherein:

the at least one language is a native language of the voter.

32. A method in accordance with claim 31 wherein:

the at least one unique vote word comprises two different vote words combined from the group of unique vote words which are understood by the voters at each polling location with a number of combined two different vote words from the group of unique vote words equaling $m^2$ and each polling location is assigned the $m^2$ combined two different unique vote words;

each polling location comprises a number n of electronic voting machines; and each of the combined two different unique vote words are assigned to only a single electronic voting machine at each polling location with a number of unique vote words assigned to each electronic voting machine equaling $$\frac{m^2}{n}.$$

33. A processor for use with the method of claim 32 at each polling location wherein:

the processor generates the group of unique vote words.

34. A processor for use with the method of claim 31 at each polling location wherein:

the processor server generates the group of unique vote words.

35. A processor for use with the method of claim 4 at each polling location wherein:

the processor generates the group of unique vote words.

36. A method in accordance with claim 1 wherein:

the at least one language is a native language of the voter.

37. A method in accordance with claim 36 wherein:

the at least one unique vote word comprises two different vote words combined from the group of unique vote words which are understood by the voters at each polling location with a number of combined two different vote words from the group of unique vote words equaling $m^2$; and each polling location is assigned the $m^2$ combined two different unique vote words;

each polling location comprises a number n of electronic voting machines; and each of the combined two different unique vote words are assigned to only a single electronic voting machine at each polling location with a number of unique vote words assigned to each electronic voting machine equaling $$\frac{m^2}{n}.$$

38. A processor for use with the method of claim 37 at each polling location wherein:

the processor generates the group of unique vote words.

39. A processor for use with the method of claim 36 at each polling location wherein:

the processor generates the group of unique vote words.

40. A method in accordance with claim 1 wherein:

the at least one unique vote word comprises two different vote words combined from the group of unique vote words which are understood by the voters at each polling location with a number of combined two different vote words from the group of unique vote words equaling $m^2$ and each polling location is assigned the $m^2$ combined two different unique vote words;

each polling location comprises a number n of electronic voting machines; and each of the combined two different unique vote words are assigned to only a single electronic voting machine at each polling location with a number of unique vote words assigned to each electronic voting machine equaling $$\frac{m^2}{n}.$$

41. A server for use with the method of claim 40 at each polling location wherein:

the server generates the group of vote words.

42. A program stored on a storage medium which when executed on a processor performs the generation of the group of unique vote words $m^2$ combined unique vote words of claim 40.

43. A processor for use with the method of claim 1 wherein:

the processor generates the group of unique vote words.

44. A processor for use with the method of claim 43 at each polling location wherein:

the processor generates the group of unique vote words.

45. A program stored on a storage medium which when executed on a processor performs the generation of the group of unique vote words of claim 1.

46. A system for providing voter confirmation that electronically cast ballots have been properly registered comprising:

at least one electronic voting machine located at at least one polling location;

at least one processor for generating a group of unique vote words which each comprise at least one word within at least one language understood by voters at at least one polling location which group of unique vote words are assigned to the at least one voting machine at the at least one polling location such that each voter at the at least one polling location is assigned at least one voting word;

at least one storage associated with each polling location, each unique vote word upon casting of voter's ballot being associated and recorded with the voter's ballot electronically cast by the voter at the at least one polling location by the at least one storage; and a publishing system, which is accessible by the voters at the at least one polling location after casting of ballots by the voters at the at least one polling location that publishes the unique vote words stored by the at least one storage which are associated with the votes which were cast at the at least one polling location whereby a voter who cast a ballot at the at least one polling location may check the published at least one unique vote word associated with the voters votes at the at least one polling location as published to permit the voter to verify that the voter's votes were properly recorded.

* * * * *